(12) United States Patent
Huang et al.

(10) Patent No.: US 8,857,600 B2
(45) Date of Patent: Oct. 14, 2014

(54) CONVEYING APPARATUS

(71) Applicant: Industrial Technology Research Institute, Hsinchu (TW)

(72) Inventors: Guo-Shing Huang, Hsinchu County (TW); Hsin-Yun Hsu, Hsinchu County (TW); Ching-Chih Wei, Hsinchu (TW); Chen-Lung Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/858,900

(22) Filed: Apr. 8, 2013

(65) Prior Publication Data

US 2014/0144753 A1 May 29, 2014

(30) Foreign Application Priority Data

Nov. 26, 2012 (TW) .............................. 101144160 A

(51) Int. Cl.
- B65G 47/66 (2006.01)
- B65G 37/00 (2006.01)

(52) U.S. Cl.
- CPC .................................. B65G 37/005 (2013.01)
- USPC ......................................... 198/600; 198/841

(58) Field of Classification Search
- USPC ................. 198/600, 837, 841; 65/182.1, 342
- See application file for complete search history.

(56) References Cited

U.S. PATENT DOCUMENTS

| | | | | | |
|---|---|---|---|---|---|
| 2,237,345 | A | * | 4/1941 | Frentzel, Jr. et al. | 198/600 |
| 2,268,724 | A | * | 1/1942 | Shackelford | 198/600 |
| 4,015,799 | A | | 4/1977 | Koski et al. | |
| 4,122,937 | A | * | 10/1978 | Vischer et al. | 198/600 |
| 7,421,801 | B2 | * | 9/2008 | Kluetsch et al. | 198/600 |
| 7,677,058 | B2 | | 3/2010 | Hawtof et al. | |
| 7,992,703 | B2 | * | 8/2011 | Underberg et al. | 198/600 |
| 2011/0147162 | A1 | * | 6/2011 | Bogle | 198/600 |
| 2011/0192878 | A1 | | 8/2011 | Teranishi et al. | |

FOREIGN PATENT DOCUMENTS

| | | |
|---|---|---|
| TW | 201206849 | 2/2012 |
| TW | 201217251 | 5/2012 |
| TW | 201226298 | 7/2012 |
| TW | 201245022 | 11/2012 |

OTHER PUBLICATIONS

Hoehla et al., "Full Color AM-LCDs on Flexible Glass Substrates," Proceedings of the 17th International Display Workshop, Dec. 2010, pp. 1689-1692.
Wu et al., "Color ChLC e-paper display with 100 um flexible glass substrates," SID Display Week, May 18, 2011, pp. 1-3.
Lo et al., "Flexible glass substrates for organic TFT active matrix electrophoretic displays," SID Display Week, May 18, 2011, pp. 1-2.

(Continued)

*Primary Examiner* — James R Bidwell
(74) *Attorney, Agent, or Firm* — Jianq Chyun IP Office

(57) ABSTRACT

A conveying apparatus used for conveying an object is provided. The conveying apparatus includes a first conveying unit, a second conveying unit, and a supporting unit. An object leans against the first conveying unit and the second conveying unit and moves from the first conveying unit toward the second conveying unit along a conveying path. The supporting unit is configured between the first conveying unit and the second conveying unit to support and guide the object.

21 Claims, 7 Drawing Sheets

(56) References Cited

OTHER PUBLICATIONS

Garner et al., "Flexible glass substrates for continuous manufacturing," Flexible Electronics and Displays Conference, Feb. 9, 2011, pp. 1-14.

Evan Schwartz, "Roll to Roll Processing for Flexible Electronics," MSE 542: Flexible Electronics, Cornell University, May 11, 2006, pp. 1-24.

"Office Action of Taiwan Counterpart Application", issued on Jul. 28, 2014, pp. 1-6.

* cited by examiner

CONVEYING APPARATUS

CROSS-REFERENCE TO RELATED APPLICATION

This application claims the priority benefit of Taiwan application serial no. 101144160, filed on Nov. 26, 2012. The entirety of the above-mentioned patent application is hereby incorporated by reference herein and made a part of this specification.

TECHNICAL FIELD

The invention relates to a conveying apparatus, and more particularly to a conveying apparatus for a flexible glass.

BACKGROUND

A flexible glass has the quality of being a glass and a flexible substrate, and the demand for a thinner and thinner glass is increasing as a result of the development of light and thin electronic products such as planar substrates in e-Papers, and covers, touch-sensors, organic light-emitting elements, and electronic devices, etc. in photovoltaic modules.

As the thickness of a glass decreases, the glass becomes more flexible. Therefore, the flexible glass may be conveyed via roll-to-roll conveyance mechanism. However, during handling flexible glass, it still needs to be considered whether the flexible glass substrate has qualified mechanical properties and endurance to impact. In addition, it is necessary to prevent the flexible glass substrate from being damaged during the conveyance to ensure the yield rate of the flexible glass substrate; the reason is that even though the glass is already flexible to a certain degree given that the glass is hardly flawed and extremely thin, its material property of being brittle still remains. Accordingly, when designing a conveying equipment, it still needs to be considered whether the conveying equipment is capable of stopping a break from further crashing when the flexible glass being conveyed is partly broken.

SUMMARY

An embodiment of the disclosure provides a conveying apparatus, which guides and supports an object through a supporting unit during conveyance.

An embodiment of the disclosure provides a conveying apparatus for conveying an object. The conveying apparatus includes a first conveying unit, a second conveying unit, and a supporting unit. The object leans against the first conveying unit and the second conveying unit, and moves from the first conveying unit toward the second conveying unit along a conveying path. The supporting unit is configured between the first conveying unit and the second conveying unit to support and guide the supporting unit.

Based on the aforementioned, during the conveyance, the object drooping down the conveying path may be supported and guided by the supporting unit, which is configured between the first conveying unit and the second conveying unit, to return to the conveying path by a guiding part so that the object may be transported smoothly to the second conveying unit. The process prevents part of the object that deviates from the conveying path from bumping against the second conveying unit, such that the object may remain intact and the conveying efficiency may be increased effectively.

In order to make the aforementioned features and advantages of the invention more comprehensible, embodiments accompanying figures are described in detail below.

DESCRIPTION OF EMBODIMENTS

A conveying apparatus of the present application is for conveying an object and is capable of effectively preventing interference between part of the object that deviates from a conveying path and the conveying apparatus. The following embodiments provide a further description of the conveying apparatus by using a flexible glass as a conveying target. Other objects having the same property as the flexible glass may also be conveyed by the conveying apparatus.

Figure 1:
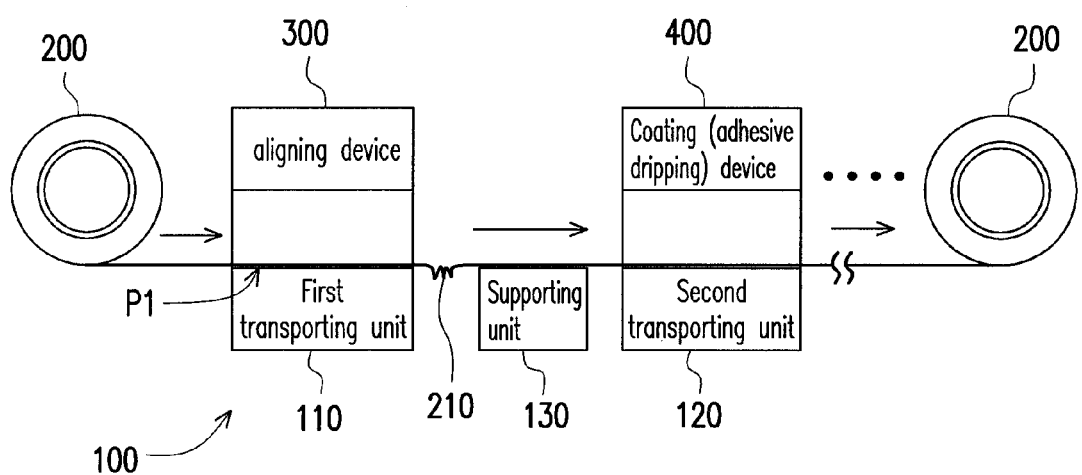
FIG. 1 is a flow chart of processing a flexible glass according to one embodiment of the disclosure.

FIG. 1 is a flow chart of processing a flexible glass according to one embodiment of the disclosure. Please refer to FIG. 1. Since a glass becomes flexible when the thickness of the glass decreases to a certain degree, it is suitable for being conveyed by a roll-to-roll winding apparatus 100. Moreover, during the conveyance, a series of processing may be performed on a edge-taped flexible glass 200 by various processing apparatuses such as an aligning apparatus 300, a coating (adhesive dripping) apparatus 400, and etc. as shown in FIG. 1. The present application provides no limitation to the type of the processing apparatus disposed on the winding apparatus 100. A part of the process is described in the following paragraphs.

In the embodiment, the winding apparatus 100 includes a first conveying unit 110, a second conveying unit 120 and a supporting unit 130 configured between the first conveying unit 110 and the second conveying unit 120. As described before, although the flexible glass 200 which is hardly flawed and is extremely thin already has a certain degree of flexibility, its brittle material property still remains. Therefore, in the processing, the flexible glass 200 is still likely to be broken.

For example, the flexible glass 200 in the embodiment moves from the first conveying unit 110 toward the second conveying unit 120 along a conveying path P1. When the flexible glass 200 generates a break part 210 which deviates from the conveying path P1 due to ununiform internal stress after passing the first conveying unit 110, the break part 210 may be supported and guided by the supporting unit 130 between the first conveying unit 110 and the second conveying unit 120 to return to the conveying path P1. Therefore, the flexible glass 200 may be transported smoothly to the second conveying unit 120.

The process ensures that the break part 210 in the flexible glass 200 does not interfere with or bump against the winding apparatus 100 during the conveyance so as to effectively prevent the break part 210 from spreading as well as to prevent the flexible glass 200 from crashing, which subsequently affects the conveyance.

It needs to be indicated that the conveying path P1 is the moving path on which the flexible glass 200 moves intact on the winding apparatus 100.

Besides, the present application provides no limitation to the suitability of the supporting unit 130. In another embodiment which is not shown, when the flexible glass 200 becomes relaxed due to insufficient tension after passing the first conveying unit 110, that is, a part of the flexible glass 200 droops down the conveying path P1, the supporting unit 130 may also provide the function of guiding and supporting the flexible glass 200 so that the flexible glass 200 may be guided back to the conveying path P1 smoothly and then transported to the second conveying unit 120.

Figure 2:
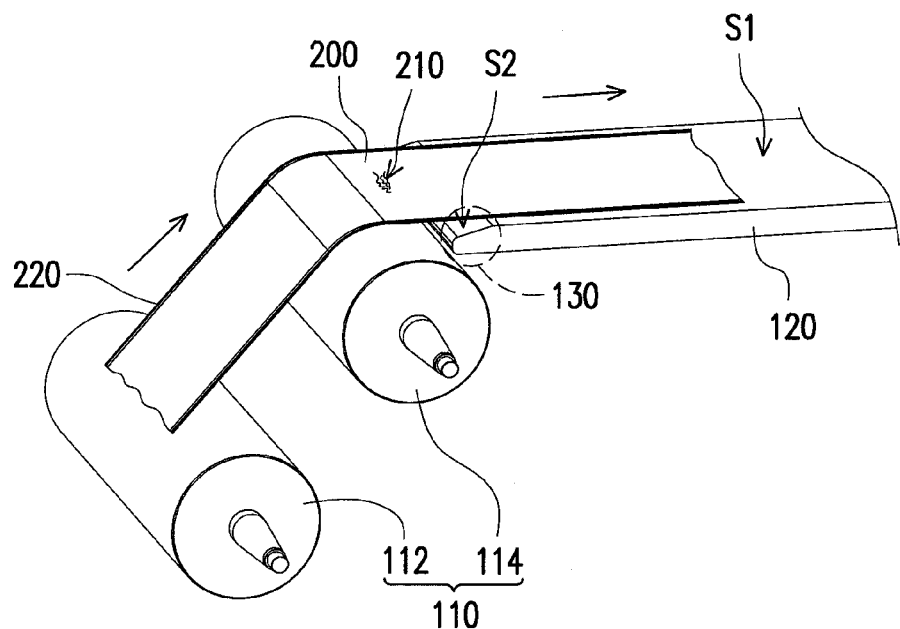
FIG. 2 is a local schematic view of a conveying apparatus in one embodiment of the disclosure.
Figure 3:
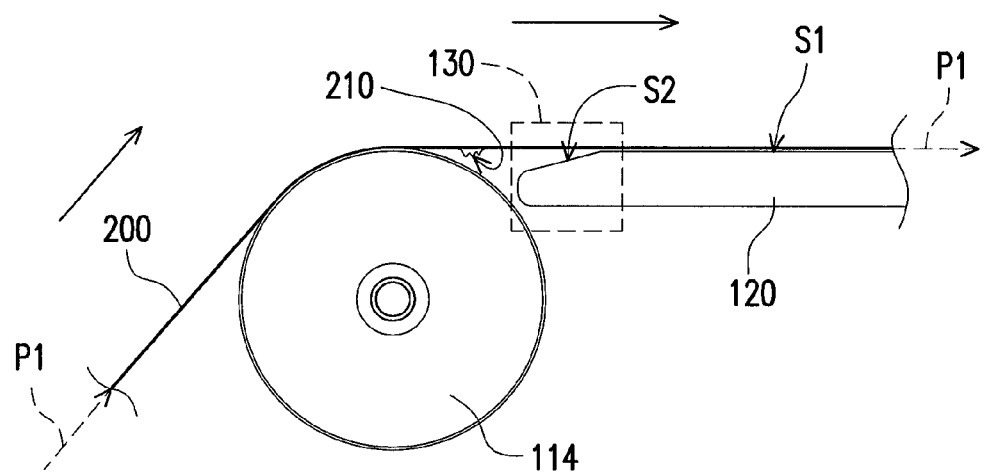
FIG. 3 is a local enlargement side view of FIG. 2.

FIG. 2 is a local schematic view of a conveying apparatus in one embodiment of the disclosure. FIG. 3 is a local enlargement side view of FIG. 2. Please refer to both FIG. 2 and FIG. 3. Specifically, the first conveying unit 110 in the embodiment is a set of rollers, which includes a first roller 112 and a second roller 114, and the second conveying unit 120 is a supporting stage. The flexible glass 200 is conveyed by the first roller 112 and the second roller 114 to be transported onto a conveying surface S1 of the second conveying unit 120. In the embodiment, the flexible glass 200 also has two connecting pieces 220 both at the glass edges thereof, for example, a tape formed of polyimide (PI) so that the flexible glass 200 may be enforced against breakage without breaking apart, and it is also advantageous for keeping the breakage from peripheral object of the conveying units 110 or 120 to ensure the flexible glass 200 is transported smoothly in the conveyance on the conveying unit. Moreover, the supporting unit 130 has a guiding surface S2, which is located below the conveying path P1 and connected to the conveying surface S1 of the second conveying unit 120. As shown in FIGS. 2 and 3, the supporting unit 130 and the second conveying unit 120 may be formed integrally. To be more specific, the supporting unit 130 is a chamfer structure extending from the second conveying unit 120 toward the first conveying unit 110.

In another embodiment which is not shown, the same effect may be achieved by assembling the supporting unit with the chamfer structure to the second conveying unit.

Accordingly, when the break part 210 (marked in FIG. 1) in the flexible glass 200 is generated as the flexible glass 200 passes the second roller 114, although the conveyance of the flexible glass 200 may not be interrupted in the presence of the connecting pieces 220, the break part 210 may still droop down the conveying path P1 due to gravity. Therefore, the guiding surface S2 of the supporting unit 130 is used to guide the break part 210 back to the conveying path P1 (that is, to allow the break part 210 to converge gradually relative to the unbroken part of the flexible glass 200). Accordingly, the break part 210 of the flexible glass 200 may be conveyed to the second conveying unit 120 smoothly, preventing the break part 210 from bumping against the second conveying unit 120 and seriously cracked subsequently.

Figure 4:
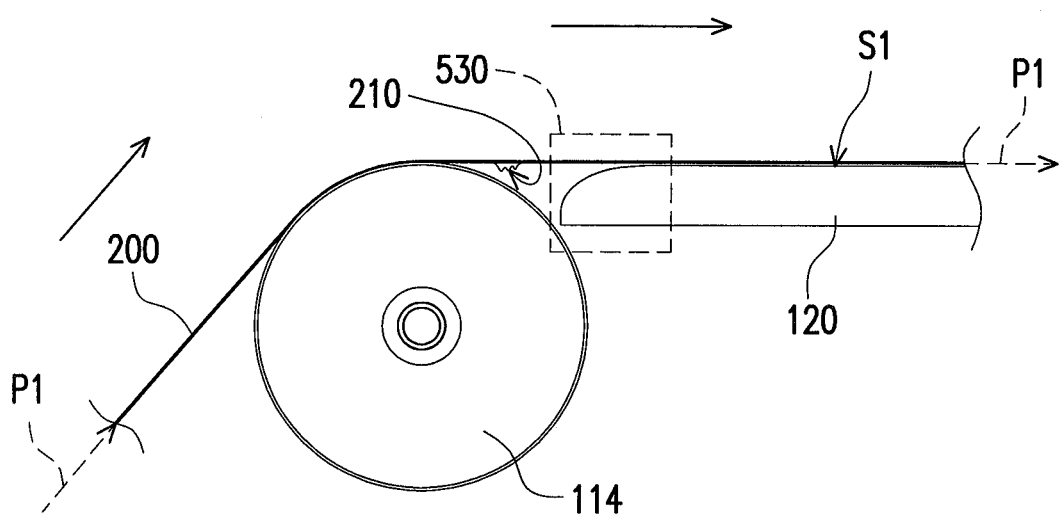
FIG. 4 is a local enlargement side view of a conveying apparatus in another embodiment of the disclosure.

FIG. 4 is a local enlargement side view of a conveying apparatus in another embodiment of the disclosure. Different from the aforementioned embodiment, a supporting unit 530 in the embodiment and the second conveying unit 120 are formed integrally. Besides, the supporting unit 530 is a fillet structure extending from the second conveying unit 120 toward the first conveying unit 110, which also has a supporting and guiding effect for the break part 210 drooping down the conveying path P1. Certainly, in another embodiment which is not shown, the same effect of the aforementioned embodiment may be achieved by assembling the supporting unit with the fillet on the second conveying unit.

Figure 5:
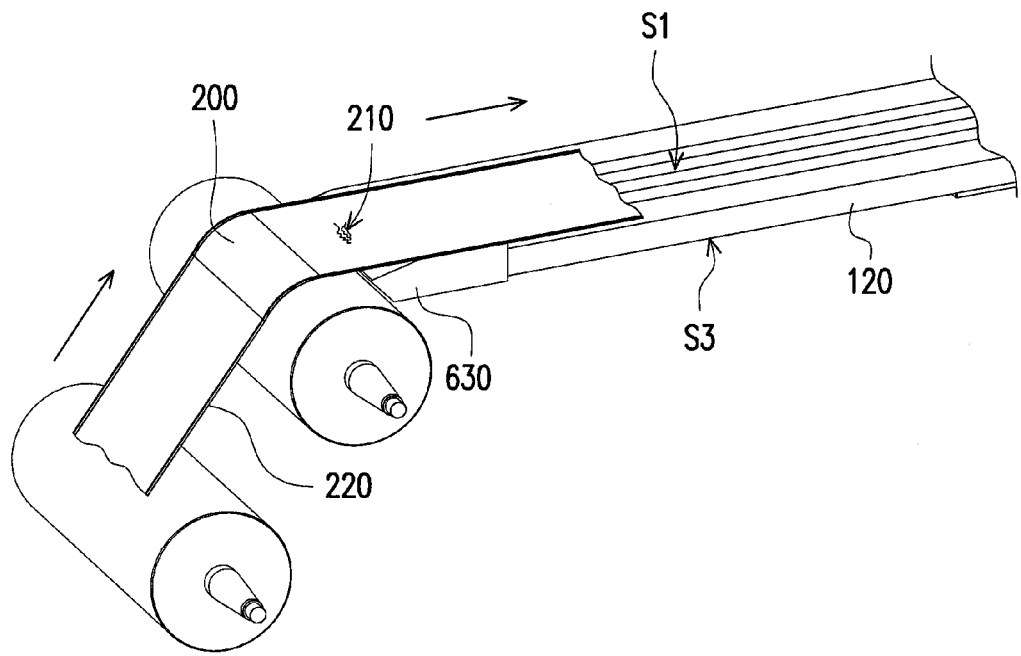
FIG. 5 is a local schematic view of a conveying apparatus in another embodiment of the disclosure.
Figure 6:
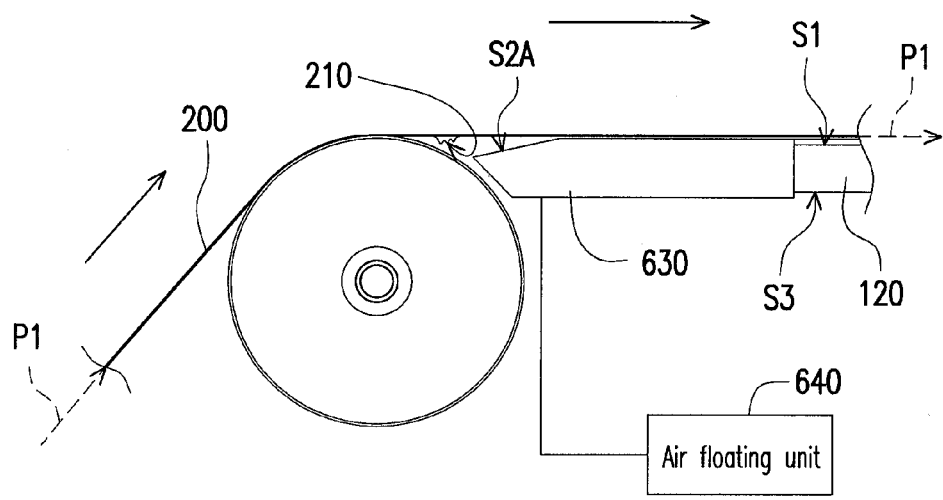
FIG. 6 is a local enlargement side view of FIG. 5.

FIG. 5 is a local schematic view of a conveying apparatus in another embodiment of the disclosure. FIG. 6 is a local enlargement side view of FIG. 5. Please refer to both FIGS. 5 and 6. A supporting unit 630 in the embodiment is a plate-shaped bending structure, which is assembled at the side of the second conveying unit 120. Specifically, the second conveying unit 120 further has a bottom surface S3 facing away from the conveying surface S1; two ends of the supporting unit 630 are detachably assembled on the conveying surface S1 and the bottom surface S3 respectively so as to hold the second conveying unit 120 in between, and allows the conveying surface S1 of the second conveying unit 120 to engage a guiding surface S2A of the supporting unit 630.

In other words, the supporting unit 630 in the embodiment may be assembled on any conveying component of a conveying apparatus 600 depending on the processing demand of the flexible glass 200. That is, users configure the supporting unit 630 at the conveying component where the break is most likely to be caused during the processing of the flexible glass 200 so that the flexible glass 200 and the break part 210 may be transported more smoothly.

Figure 7:
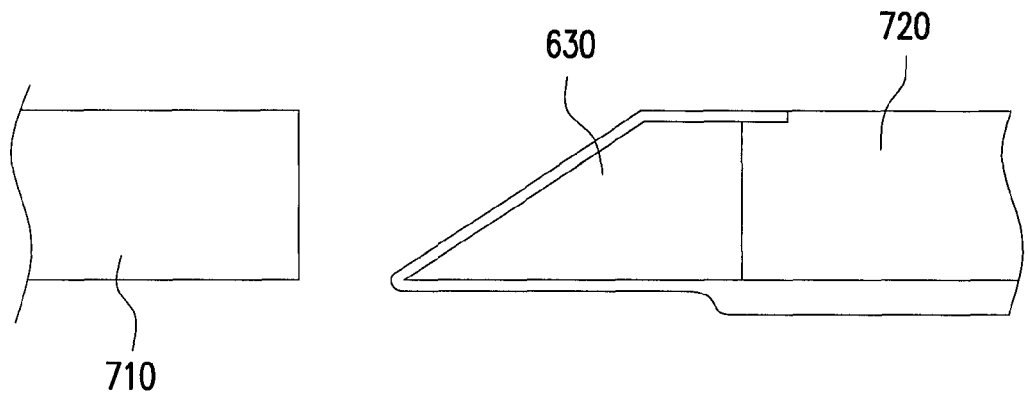
FIG. 7 is a local schematic view of a conveying apparatus in another embodiment of the disclosure.

For example, FIG. 7 is a local schematic view of a conveying apparatus in another embodiment of the disclosure. Please refer to FIG. 7 and compare it with FIG. 6. FIG. 7 is different from the embodiment in FIG. 6 in that a first conveying unit 710 in the embodiment is a supporting stage and a second conveying unit 720 is an air bar. The supporting unit 630 is assembled at the side of the second unit 720 and the same effect of the aforementioned embodiment may also be achieved.

In addition, please refer to FIG. 6 again. The conveying apparatus 600 further includes an air floating unit 640, which is connected to the supporting unit 630 for providing an free contact conveying effect to the flexible glass 200 passing the supporting unit 630. For example, there are a plurality of tiny openings (not shown) on the guiding surface S2A of the supporting unit 630, guiding air flow into the supporting unit 630 by an air pressure device (not shown) and to emit from the tiny openings to provide the air floating effect to an object on the guiding surface S2A. Accordingly, when the break part 210 passes the guiding surface S2A of the supporting unit 630, the structural contact between the break part 210 and the supporting unit 630 may be reduced, and the friction between the flexible glass 200 (and the break part 210) and the guiding surface S2A may also be reduced so as to achieve the effect that the flexible glass 200 (and the break part 210) may be conveyed to the second conveying unit 120 smoothly.

Figure 8:
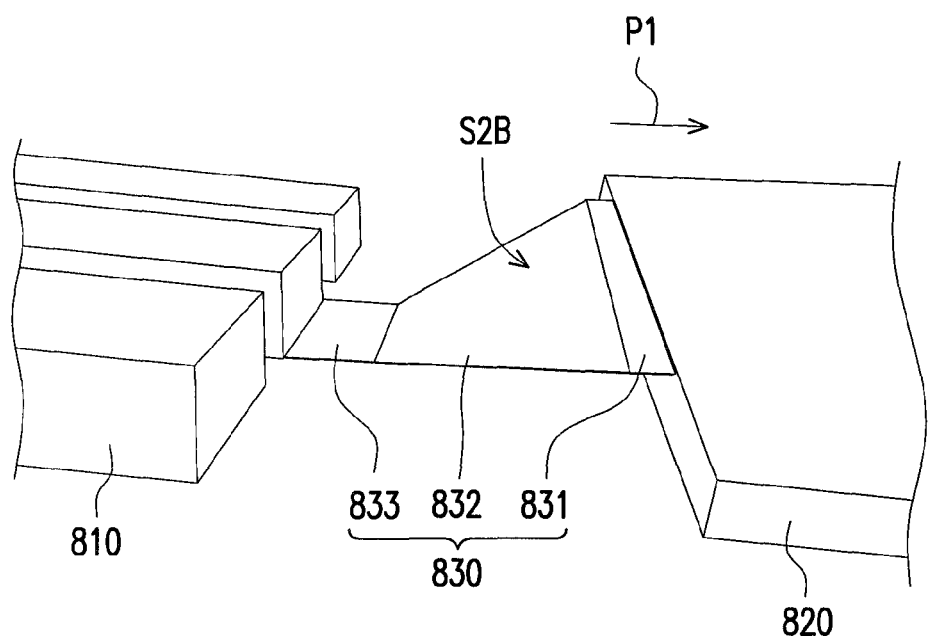
FIG. 8 is a local schematic view of a conveying apparatus in another embodiment of the disclosure.

FIG. 8 is a local schematic view of a conveying apparatus in another embodiment of the disclosure. Please refer to FIG. 8. In the embodiment, a first conveying unit 810 is an air bar and the second conveying unit 820 is a supporting stage. A supporting unit 830 has connecting pieces 831 and 833, and a guiding piece 832. The connecting piece 831 is connected to the second conveying unit 820; the connecting piece 833 is connected to the bottom of the first conveying unit 810. The guiding piece 832 is located between the connecting pieces 831 and 833 and has a guiding surface S2B. That is, the supporting unit 830 in the embodiment is connected between the first conveying unit 810 and the second conveying unit 820 and allows the conveying surface S2B to be in the same direction as the conveying path P1.

Figure 9:
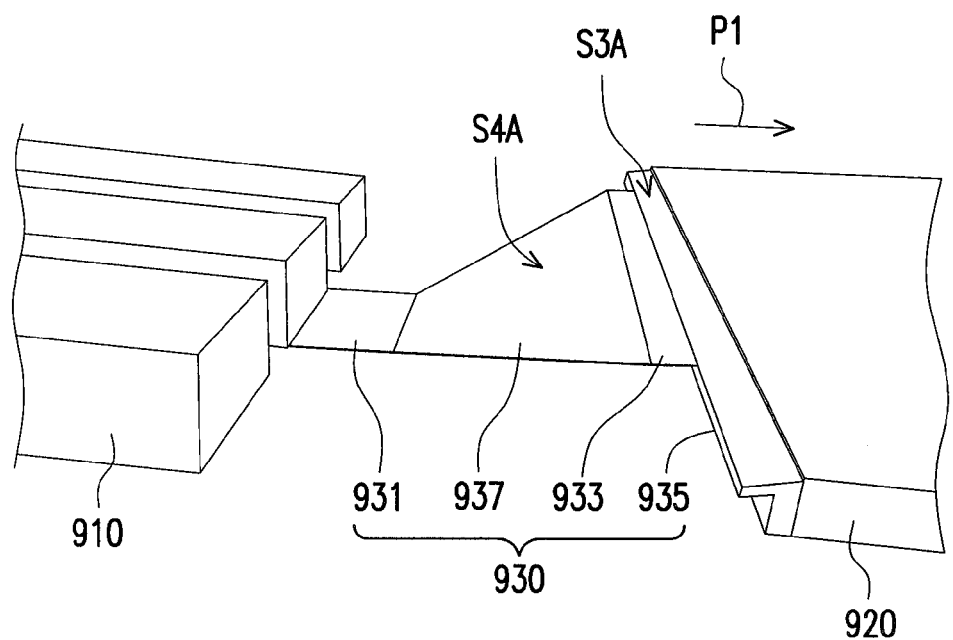
FIG. 9 is a local schematic view of a conveying apparatus in another embodiment of the disclosure.

FIG. 9 is a local schematic view of a conveying apparatus in another embodiment of the disclosure. Please refer to FIG. 9. In the embodiment, a first conveying unit 910 is an air bar;

a second conveying unit 920 is a supporting stage. A supporting unit 930 includes connecting pieces 931 as well as 933 and guiding pieces 935 as well as 937, wherein the connecting piece 931 is connected to the bottom of the first conveying unit 910. The guiding piece 935 is connected to the second conveying unit 920; the connecting piece 933 is connected to the guiding piece 935; the guiding piece 937 is connected between the connecting pieces 931 and 933.

In the embodiment, the supporting unit 930 is a bridge structure between the first conveying unit 910 and the second conveying unit 920, and guiding surfaces S3A and S4A of the guiding pieces 935 and 937 are used for supporting and guiding the flexible glass 200 and the break part 210 thereof (as shown in FIGS. 2 and 3, or in FIGS. 5 and 6) to be conveyed to the second conveying unit 920 smoothly.

In other words, the supporting unit 930 in the embodiment is formed as a multiple-level supporting and guiding structure for gradually converging the break part 210 toward the conveying path P1 and preventing the friction or even bumping of the supporting unit 930 resulting from the over large slope of the guiding path when the break part 210 deviates far from the conveying path P1.

The type of the conveying unit is not limited herein. Designers may recombine the conveying unit in the aforementioned embodiments or select a suitable stage for conveying the flexible glass 200 depending on the conveyance need and environment.

Figure 10:
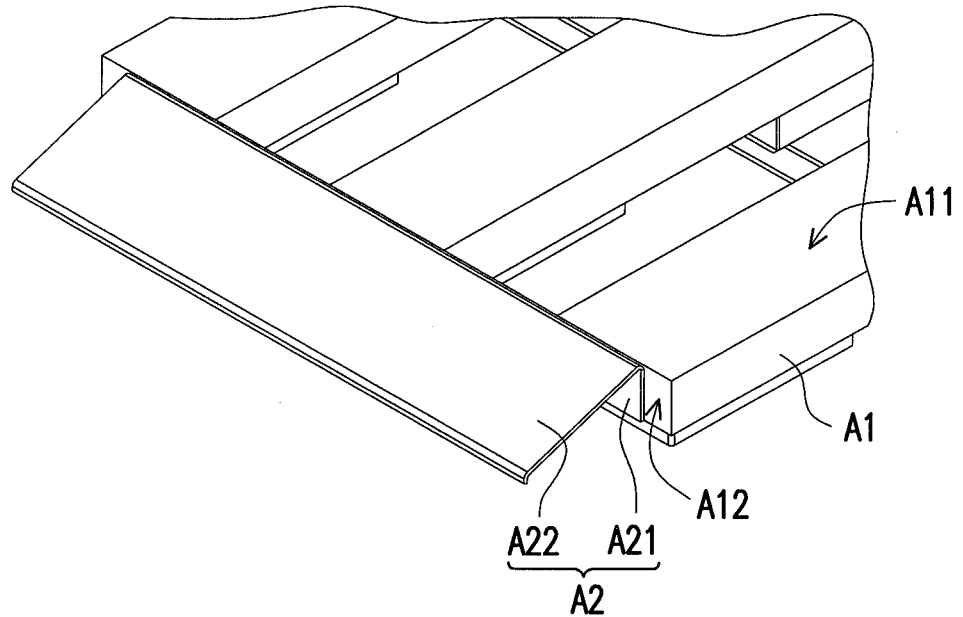
FIG. 10 is a local schematic view of a conveying apparatus in another embodiment of the disclosure.
Figure 11:
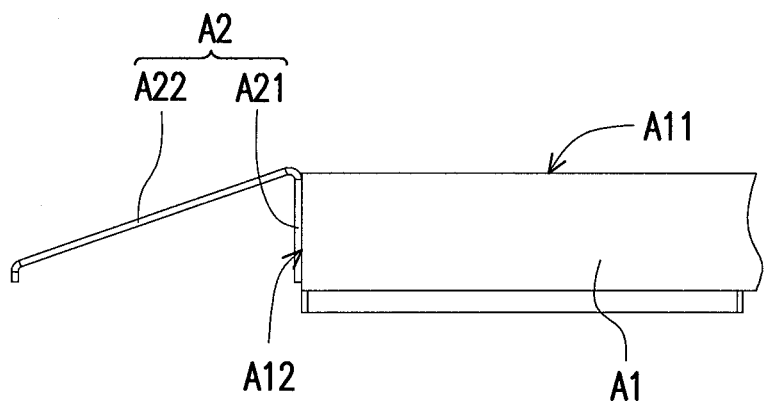
FIG. 11 is a local enlargement side view of the conveying apparatus in FIG. 10.

FIG. 10 is a local schematic view of a conveying apparatus in another embodiment of the disclosure. FIG. 11 is a local enlargement side view of the conveying apparatus in FIG. 10. In the embodiment, a second conveying unit A1 is an air floating device, and a supporting unit A2 is a bending plate assembled to a side of the second conveying unit A1. In further, the supporting unit A2 includes a connecting piece A21 and a guiding pieces A22, wherein the connecting piece A21 is fixed to a side wall A12 of the second conveying unit A1. The guiding piece A22 is inclined relative to a top surface A11 of the second conveying unit A1.

Based on the aforementioned, in the aforementioned embodiments of the disclosure, the supporting unit configured between the first conveying unit and the second conveying unit may allow the break part being drooping down the conveying path to be guided back to the conveying path by the guiding part so that the break part of the flexible glass may be conveyed to the second conveying unit smoothly, which prevents the break part of the flexible glass from bumping against the second conveying unit resulting from deviating from the conveying path so as to prevent the break part from further spreading.

Moreover, the air floating unit may allow conveyance with low friction between the flexible glass and the supporting unit and that the break part may be raised back to the conveying path by the air floating effect. Furthermore, the multiple-level guiding surface may also help the break part to converge toward the conveying path, thereby providing a more even support as well as a raising and guiding path.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A conveying apparatus for conveying an object, comprising:
    a first conveying unit;
    a second conveying unit, the object leaning against the first conveying unit and the second conveying unit, and moving from the first conveying unit toward the second conveying unit along a conveying path; and
    a supporting unit, configured between the first conveying unit and the second conveying unit to support the object, and being a chamfer structure extending from the second conveying unit toward the first conveying unit, wherein the second conveying unit has a conveying surface, the supporting unit has a guiding surface, and the guiding surface is located below the conveying path and connected to the conveying surface.

2. The conveying apparatus according to claim 1, wherein the supporting unit is connected between the first conveying unit and the second conveying unit.

3. The conveying apparatus according to claim 1, wherein the first conveying unit is a set of rollers, and the second conveying unit is an air floating device.

4. The conveying apparatus according to claim 1, wherein the first conveying unit is one of an air floating device and a supporting stage, and the second conveying unit is the other one of the air floating device and the supporting stage.

5. The conveying apparatus according to claim 1, further comprising:
    an air floating unit, connected to the supporting unit, so as to raise the object back to the conveying path.

6. The conveying apparatus according to claim 1, wherein the object is a flexible glass having a break part drooping down the conveying path when passing the first conveying unit, and the supporting unit guides the break part back to the conveying path so that the break part of the flexible glass is conveyed to the second conveying unit.

7. The conveying apparatus according to claim 1, wherein the object is a flexible glass, and a part of the flexible glass droops down the conveying path when passing the first conveying unit, and the supporting unit guides the drooping part of the flexible glass back to the conveying path so that the flexible glass is conveyed to the second conveying unit.

8. A conveying apparatus for conveying an object, comprising:
    a first conveying unit;
    a second conveying unit, the object leaning against the first conveying unit and the second conveying unit, and moving from the first conveying unit toward the second conveying unit along a conveying path; and
    a supporting unit, configured between the first conveying unit and the second conveying unit to support the object, and being a fillet structure extending from the second conveying unit toward the first conveying unit, wherein the second conveying unit has a conveying surface, the supporting unit has a guiding surface, and the guiding surface is located below the conveying path and connected to the conveying surface.

9. The conveying apparatus according to claim 8, wherein the supporting unit is connected between the first conveying unit and the second conveying unit.

10. The conveying apparatus according to claim 8, wherein the first conveying unit is a set of rollers, and the second conveying unit is an air floating device.

11. The conveying apparatus according to claim 8, wherein the first conveying unit is one of an air floating device and a supporting stage, and the second conveying unit is the other one of the air floating device and the supporting stage.

12. The conveying apparatus according to claim 8, further comprising:
    an air floating unit, connected to the supporting unit, so as to raise the object back to the conveying path.

13. The conveying apparatus according to claim 8, wherein the object is a flexible glass having a break part drooping down the conveying path when passing the first conveying unit, and the supporting unit guides the break part back to the conveying path so that the break part of the flexible glass is conveyed to the second conveying unit.

14. The conveying apparatus according to claim 8, wherein the object is a flexible glass, and a part of the flexible glass droops down the conveying path when passing the first conveying unit, and the supporting unit guides the drooping part of the flexible glass back to the conveying path so that the flexible glass is conveyed to the second conveying unit.

15. A conveying apparatus for conveying an object, comprising:
    a first conveying unit;
    a second conveying unit, the object leaning against the first conveying unit and the second conveying unit, and moving from the first conveying unit toward the second conveying unit along a conveying path; and
    a supporting unit, configured between the first conveying unit and the second conveying unit to support the object, wherein the second conveying unit has a conveying surface and a bottom surface facing away from the conveying surface, and the supporting unit is a plate-shaped bending structure extending from the conveying surface to the bottom surface, wherein the supporting unit has a guiding surface, and the guiding surface is located below the conveying path and connected to the conveying surface.

16. The conveying apparatus according to claim 15, wherein the supporting unit is connected between the first conveying unit and the second conveying unit.

17. The conveying apparatus according to claim 15, wherein the first conveying unit is a set of rollers, and the second conveying unit is an air floating device.

18. The conveying apparatus according to claim 15, wherein the first conveying unit is one of an air floating device and a supporting stage, and the second conveying unit is the other one of the air floating device and the supporting stage.

19. The conveying apparatus according to claim 15, further comprising:
    an air floating unit, connected to the supporting unit, so as to raise the object back to the conveying path.

20. The conveying apparatus according to claim 15, wherein the object is a flexible glass having a break part drooping down the conveying path when passing the first conveying unit, and the supporting unit guides the break part back to the conveying path so that the break part of the flexible glass is conveyed to the second conveying unit.

21. The conveying apparatus according to claim 15, wherein the object is a flexible glass, and a part of the flexible glass droops down the conveying path when passing the first conveying unit, and the supporting unit guides the drooping part of the flexible glass back to the conveying path so that the flexible glass is conveyed to the second conveying unit.

\* \* \* \* \*